US010457521B2

(12) United States Patent
Légeret et al.

(10) Patent No.: US 10,457,521 B2
(45) Date of Patent: Oct. 29, 2019

(54) SYSTEM AND METHOD FOR ALTERNATIVELY INTERACTING WITH ELEVATORS

(71) Applicant: Inventio AG, Hergiswil (CH)

(72) Inventors: Benoît Légeret, Chatel-st-Denis (CH); Martin Hellebrandt, Hausen am Albis (CH)

(73) Assignee: Inventio AG, Hergiswil (CH)

( * ) Notice: Subject to any disclaimer, the term of this patent is extended or adjusted under 35 U.S.C. 154(b) by 368 days.

(21) Appl. No.: 15/532,370

(22) PCT Filed: Dec. 3, 2015

(86) PCT No.: PCT/EP2015/078441
§ 371 (c)(1),
(2) Date: Jun. 1, 2017

(87) PCT Pub. No.: WO2016/087557
PCT Pub. Date: Jun. 9, 2016

(65) Prior Publication Data
US 2017/0362054 A1    Dec. 21, 2017

(30) Foreign Application Priority Data

Dec. 3, 2014  (EP) .................... 14196092

(51) Int. Cl.
*B66B 5/12*  (2006.01)
*B66B 1/34*  (2006.01)
(Continued)

(52) U.S. Cl.
CPC ........... *B66B 5/0012* (2013.01); *B66B 5/025* (2013.01); *G06K 9/00302* (2013.01); *B66B 2201/405* (2013.01); *B66B 2201/4676* (2013.01)

(58) Field of Classification Search
CPC ....... H04W 4/029; H04W 4/04; H04W 88/02; H04N 2101/00; H04N 5/23219;
(Continued)

(56) References Cited

U.S. PATENT DOCUMENTS 7,079,669 B2 *  7/2006  Hashimoto ............. B66B 1/468
                                                    187/247
7,142,694 B2 * 11/2006  Hashimoto ........ G06K 9/00369
                                                    382/106
(Continued)

FOREIGN PATENT DOCUMENTS

CN  101200256 A  6/2008
CN  101734527 A  6/2010
(Continued)

OTHER PUBLICATIONS

PNAS: "Compound facial expressions of emotions"; Shichuan Du, Yong Tao, and Aleix M. Martinez.
(Continued)

*Primary Examiner* — Marlon T Fletcher
(74) *Attorney, Agent, or Firm* — BakerHostetler

(57) ABSTRACT

An electrical or electromechanical installation includes a central processor for controlling operation of the electrical or electromechanical installation, a computer communicatively coupled to the central processor to output a control signal to the central processor, and a first video camera communicatively coupled to the computer to output an image signal to the computer. The computer has a memory storing computer instructions to determine facial characteristics from a person's face data comprised in the image signal, to categorizing the facial characteristics into at least one of predefined emotion categories, and to generate a control signal corresponding to the at least one of predefined emotion categories. The central controller operates the electrical or electromechanical installation in accordance with
(Continued)

one of several operational modes, wherein the one of several operational modes is selected as a function of the control signal.

14 Claims, 2 Drawing Sheets

(51) Int. Cl.
*B66B 5/00* (2006.01)
*G06K 9/00* (2006.01)
*B66B 5/02* (2006.01)

(58) Field of Classification Search
CPC ............ H04N 5/23206; H04N 21/4223; B66B 2201/405; B66B 2201/4676; B66B 5/0012; B66B 5/025
See application file for complete search history.

(56) References Cited

U.S. PATENT DOCUMENTS

| | | | |
|---|---|---|---|
| 7,298,256 | B2 | 11/2007 | Sato et al. |
| 8,260,042 | B2 | 9/2012 | Peng et al. |
| 8,494,231 | B2* | 7/2013 | Folta ................ G06K 9/00295 |
| | | | 382/118 |
| 2005/0264425 | A1 | 12/2005 | Sato et al. |
| 2011/0253486 | A1* | 10/2011 | Lee ........................ B66B 5/027 |
| | | | 187/392 |
| 2012/0120219 | A1* | 5/2012 | Wang ................ H04N 21/4223 |
| | | | 348/77 |
| 2017/0021282 | A1 | 1/2017 | Comploi |
| 2017/0362054 | A1* | 12/2017 | Legeret ................ B66B 5/0012 |

FOREIGN PATENT DOCUMENTS

| | | |
|---|---|---|
| CN | 101853623 A | 10/2010 |
| CN | 102741146 A | 10/2012 |
| CN | 103130060 A | 6/2013 |
| CN | 103577827 A | 2/2014 |
| CN | 103896141 A | 7/2014 |
| EP | 2562116 A1 | 2/2013 |
| TW | 201220216 A | 5/2012 |
| WO | 2009116030 A1 | 9/2009 |
| WO | 2013121425 A1 | 8/2013 |

OTHER PUBLICATIONS

"Real-time Facial Feature Detection using Conditional Regression Forests"; Matthias Dantone; Juergen Gall; Gabriele Fanelli; Luc Van Gool.
IEEE Transactions on pattern analysis and machine intelligence: "Detecting Faces in Image—A Survey"; Ming-Hsuan Yang, David J. Kriegman, Narendra Ahuja.
Wikipedia: INDECT overwiew URL: https://en.wikipedia.org/wiki/INDECT.
2014 Sixth International Conference on Intelligent Human-Machine Systems and Cybernetics: "When Arduino Meets Kinect: An Intelligent Ambient Home Entertainment Environment"; Yuhui You, Tiffany Tang, Yichen Wang.

* cited by examiner

SYSTEM AND METHOD FOR ALTERNATIVELY INTERACTING WITH ELEVATORS

CROSS-REFERENCE TO RELATED APPLICATIONS

This application is the national phase application under 35 U.S.C. § 371 claiming the benefit of priority based on International Patent Application No. PCT/EP2015/078441, filed on Dec. 3, 2015, which claims the benefit of priority based on European Patent Application No. 14196092.2, filed on Dec. 3, 2014. The contents of each of these applications are herein incorporated by reference.

FIELD OF THE INVENTION

The various embodiments described herein generally relate to electromechanical or electrical installations, such as elevator installations, that require interactions with humans. More particularly, the various embodiments described herein relate to electromechanical or electrical installations and a method for operating electromechanical or electrical installations with improved man-machine interaction.

BACKGROUND OF THE INVENTION

In an electromechanical or electrical installation, a user typically interacts with the installation via a man-machine interface (for example, an operating panel with keys or buttons, or a touchscreen). For example, in an elevator installation, an elevator user interacts with the elevator via an operating terminal, also referred to as a fixture. An operating terminal may be located inside an elevator car to place a car call (i.e., to enter a destination floor), another operating terminal is then located on each floor to enter a hall call (i.e., to call a car to a floor by pressing an "up" or "down" button). In contrast, in installations with a destination control system, the destination floor is already entered at a floor terminal before entering an elevator car. Regardless of the kind of control implemented in an elevator installation, the interaction between the elevator user and the elevator occurs typically via fixtures/operating panels, even when, e.g., an RFID card is used to call an elevator.

The interactions between a user and the electromechanical or electrical installation take place in connection with a dedicated purpose of the electromechanical or electrical installation. In an elevator installation, for example, the dedicated purpose is transporting the user from one floor to another. Certain installations expand upon the dedicated purpose in that additional interactions are provided. For example, U.S. Pat. No. 8,260,042 discloses for an elevator installation an anonymous passenger indexing system for security tracking, in which a video processor anonymously monitors passengers using color index analysis of each passenger. Based on the monitored position of each passenger data parameters such as location, direction, speed and estimated time of arrival are calculated. An elevator controller controls elevator dispatch, door operation and security functions based upon the data parameters.

Further, U.S. Pat. No. 7,298,256 describes a crisis monitoring system that detects a crisis by identifying a person's emotion from an utterance of the person. A recording unit records emotion attribute information, which includes a feature of a specific emotion in an audio signal (i.e., in the person's voice), and a control unit determines a person's emotion by analyzing the emotion attribute information. When the determined emotion indicates a crisis situation, an emergency routine is executed which includes alerting a control center or a security company.

An analysis of a vocal input to determine a person's state of mind or mood is also disclosed in WO 2009/116030 in the context of an access control system. The system inquires a person at a checkpoint to determine the person's identity and to decide whether or not access is to be granted to a person present at the checkpoint.

In view of these systems, there is a need for a technology that provides for additional interactions.

SUMMARY OF THE INVENTION

Accordingly, on aspect of such an alternative technology involves a method of operating an electrical or electromechanical installation. An image signal is received at a computer from a video camera, and facial characteristics from a person's face data comprised in the image signal are determined using the computer. The facial characteristics are categorized into at least one of predefined emotion categories using the computer, and a control signal is generated by the computer corresponding to the at least one of predefined emotion categories. The electrical or electromechanical installation is operated by a central controller in accordance with one of several operational modes, wherein the one of several operational modes is selected as a function of the control signal.

Another aspect involves an electrical or electromechanical installation having a central processor for controlling operation of the electrical or electromechanical installation, a computer communicatively coupled to the central processor to output a control signal to the central processor, and a first video camera communicatively coupled to the computer to output an image signal to the computer. The computer includes a memory storing computer instructions to determine facial characteristics from a person's face data comprised in the image signal, to categorizing the facial characteristics into at least one of predefined emotion categories, and to generate a control signal corresponding to the at least one of predefined emotion categories. The central controller operates the electrical or electromechanical installation in accordance with one of several operational modes, wherein the one of several operational modes is selected as a function of the control signal.

Briefly, the technology described herein provides for an alternative way of interacting with persons. That interaction may occur without a person actively participating in the interaction. The person's facial expression may therefore be genuine and reflect the person's actual emotional state. Determining the emotional state allows adapting the installation's operational modes to certain situations. In one embodiment, the person is a passenger in an elevator car of an elevator installation. From a psychological perspective, using elevators is for some passengers challenging because of the confined space of a car and the closeness to other passengers. If those passengers and their emotional states are recognized, it is possible to adjust the operational mode to make using an elevator more pleasant. Further, potential risks due to, for example, angry passengers with an aggressive behavior can be identified and addressed as early as possible. For example, such a passenger may receive special treatment, e.g., faster service without stops, or may be prohibited from using the elevator when found to be a security risk.

BRIEF DESCRIPTION OF THE DRAWINGS

The novel features and method steps characteristic of the improved technology are set out in the claims below. The improved technology itself, however, as well as other features and advantages thereof, are best understood by reference to the detailed description, which follows, when read in conjunction with the accompanying drawings, wherein:

DETAILED DESCRIPTION OF EMBODIMENTS OF THE INVENTION

Figure 1:
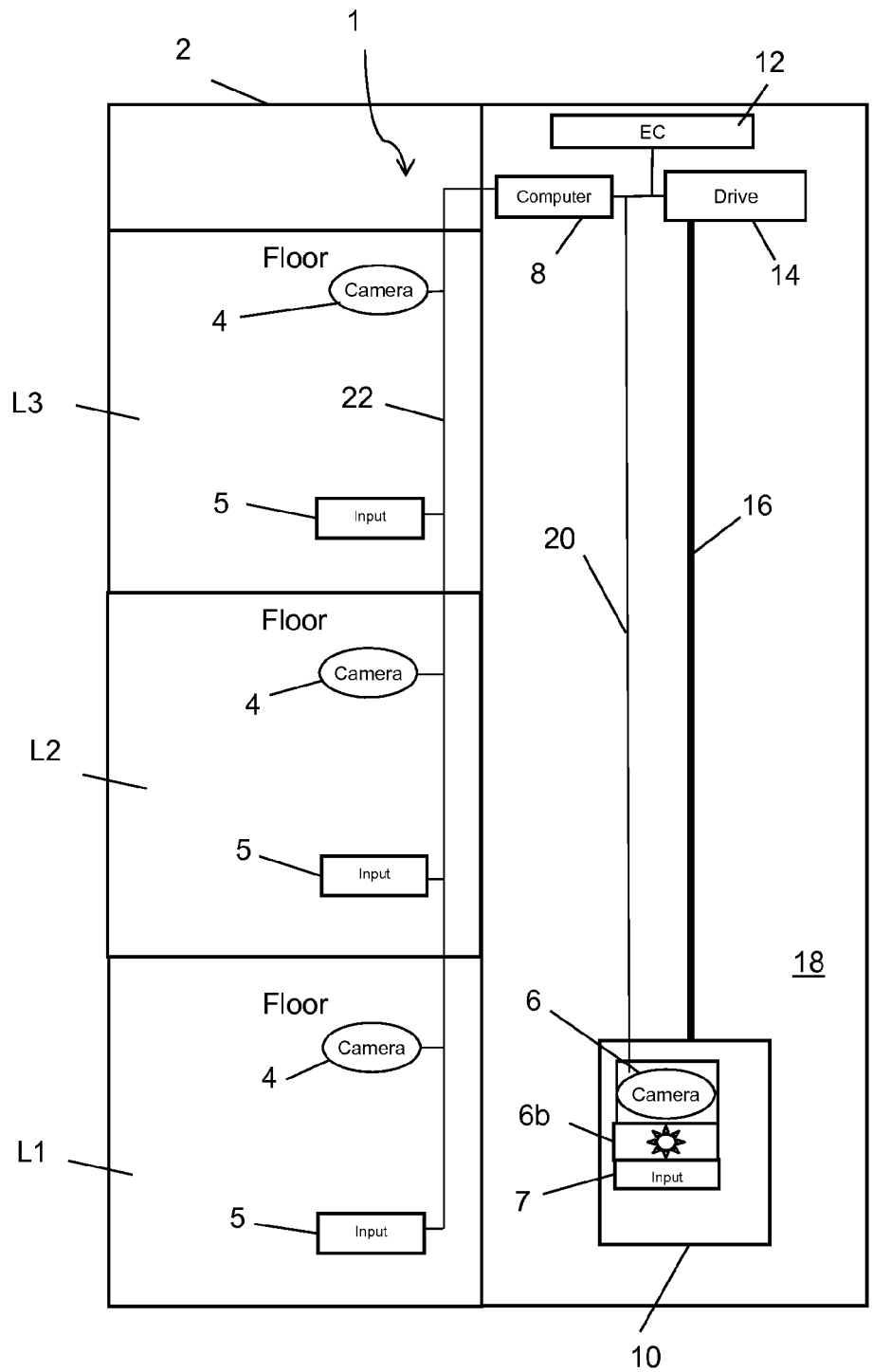
FIG. 1 shows a schematic illustration of an elevator installation as one example of an electrical or electromechanical installation.

FIG. 1 illustrates one embodiment of an elevator installation 1 as one example of an electrical or electromechanical installation. The various embodiments of the improved technology are described herein with reference to that elevator installation 1 that allows user interaction to provide for transportation between floors L1, L2, L3 of a building 2. It is, however, contemplated that the technology may be applied to other electrical or electromechanical installations that usually require user interaction, such as building access systems, public transportation systems or security/surveillance monitoring systems.

As used herein, user interaction means any interaction between a user and an electrical or electromechanical installation, whether intentional or unintentional, conscious or unconscious. An example of an intentional interaction is entering a command at a man-machine interface, e.g., by pressing a button, touching a sensor, presenting an information carrier (such as a badge with a bar code or an RFID transponder) or uttering a command. In contrast, being observed by a video camera in a public place, including an elevator lobby, may be unintentional, conscious or unconscious. Such interaction may result in an action (e.g., alarm, change of operation) performed by the electrical or electromechanical installation.

In the illustration of FIG. 1, building users and occupants have access and egress to the various floors L1, L2, L3 of the building 2 using the elevator installation 1. Depending on a particular configuration of the building 2, the floor L1 may be a lobby of an office building or a hotel. In the illustrated embodiment, the elevator system 1 includes an elevator car 10 and a central controller 12 (also referred to as elevator controller 12 (EC)) that acts on a drive 14 to move the elevator car 10, for example suspended by one or more tension members 16, in an elevator shaft 18, from one of the floors L1, L2, L3 to another. A tension member 16 may by a steel rope having a round cross-section, or a group of (steel or non-metallic) cords embedded in synthetic material having a non-round cross-section, e.g., a rectangular cross-section.

The general physical structure of the elevator installation 1 corresponds to the physical structure of a conventional elevator installation. In one embodiment, the physical structure includes in addition to the mentioned elements (central controller 12, drive 14 and tension member 16) a counterweight, guide rails for the elevator car 10 and the counterweight, safety equipment such as brakes and safety circuits for door mechanisms, etc. For illustrative purposes, these elements are not shown. It is contemplated that, depending on a particular embodiment of the elevator installation 1, the configuration and disposition of these elements in a shaft 18 may vary. For example, the drive 14 may be arranged in a separate machine room or directly in the shaft 18 ("machine room less elevator") at the top, as shown, or at the bottom of the shaft 18. The operation of such an elevator installation 1 is known to the skilled person and, therefore, not described here.

The elevator installation 1 of FIG. 1 includes a system for capturing at least one parameter of a user. In one embodiment such a user parameter capturing system is based upon digital video technology to generate an image signal corresponding to an individual image or a sequence of images (frames), i.e., a video sequence. For that purpose, a video camera 4 may be used, which can be operated to generate individual pictures or a video sequence. The image signal may be processed in real time. The pictures or video sequence may be stored on an internal storage medium of the video camera 4 or transmitted to an external storage medium.

A video camera 4 may be installed on each floor L1, L2, L3, as shown in FIG. 1. In another embodiment, however, some of the floors L1, L2, L3 may not be equipped with a video camera 4. In certain buildings 2 it may suffice to have a video camera 4 only in the lobby, e.g., on floor L1. An additional video camera 6 may be positioned within the elevator car 10, as shown in FIG. 1. In such an embodiment, an indicator 6b may be positioned inside the elevator car 10 to inform passengers when the video camera 6 is recording. The video cameras 4, 6 are communicatively coupled to a computer 8, which controls the operation of the video cameras 4, 6 and receives transmitted video information (i.e., image signals) from them. As described below in more detail, the computer 8 processes that video information and generates in certain situations a control signal for the elevator controller 12. For that purpose, the computer 8 is communicatively coupled to the elevator controller 12.

A communicative connection or coupling as used herein is a direct or indirect connection, which enables the unidirectional or bidirectional communication between two entities. Via such a connection or coupling, data signals and/or control signals are transmitted in a manner known to the skilled person. The connection or coupling may be achieved by an electrical wiring system (either as a system of point-to-point connections or as an electrical bus system, where entities connected to the bus system can be addressed), a radio system or a combination of a radio system and an electrical wiring system. FIG. 1 shows the communicative coupling exemplary through lines 20, 22, wherein the line 20 extends between the computer 8 and the elevator car 10, and the line 22 extends between the computer 8 and the video camera 4. In one embodiment, the line 22 is a bus system to which the video cameras 4 are connected.

The person of ordinary skill in the art recognizes that the computer 8 or its functionality of controlling the video cameras 4, 6 and executing a dedicated software program may be implemented, for example, in the elevator controller 12 or in another electrical component of the building 2, e.g., in an access control system that controls access to the building 2, floors L1, L2, L2 and/or rooms of the building 2. In such a case, the separately shown computer 8 might be omitted from FIG. 1. Depending on a particular embodiment, the implementation of the communicative connection or coupling changes accordingly. As a matter of principle, FIG. 1, therefore, is to be viewed as an exemplary embodiment. It is also contemplated that a video monitor (not shown) may be present within the building 2 or at a remote site that displays all or only selected video recordings (e. g., from the building 2 to allow security personnel to monitor the building 2.

FIG. 1 further shows input devices 5, 7 that are communicatively coupled to the elevator controller 12 and the computer 8. On each floor L1, L2, L3 an input device 5 is located to allow a person to interact with the elevator installation 1, e. g., to call an elevator. The input device 7 is located inside the elevator car 10 and may be implemented as part of an operating panel that houses the video camera 6, the indicator 6b, and the input device 7. A variety of design options exist for the operating panel; it may have a glass front behind which the video camera 6, the indicator 6b and some or all components of the input device 7 are arranged. If the glass front extends from the car floor to the car ceiling, the video camera 6 may be positioned at the upper end of the operating panel so that the video camera 6 has an optimized view over the interior of the elevator car 10. In that case, the video camera 6 is located close to the ceiling to provide for video recordings from an elevated position. In that case, the camera's field of view is least obstructed by passengers inside the elevator car 10. Close to the ceiling, the video camera 6 may be out of reach so that the risk of vandalism is reduced. Covering the video camera 6 or placing it behind the glass front further reduces the risk of damage. It is contemplated that the same considerations regarding location and protection apply to the video cameras 4 installed at the floors L1, L2, L3.

The input device 7 may in one embodiment include a keyboard to allow a passenger to enter a car call, i.e., after entering into the elevator car 10 the passenger can enter a destination floor via the keyboard. In such an embodiment, the input device 5 on the floor L1, L2, L3 may have Up/Down buttons to allow a waiting passenger to call an elevator. In another embodiment, the elevator installation 1 may be equipped with a destination call control system. Such a system allows a person to enter a destination floor via the input device 5 already on the floor L1, L2, L3 before boarding the elevator car 10.

Figure 2:
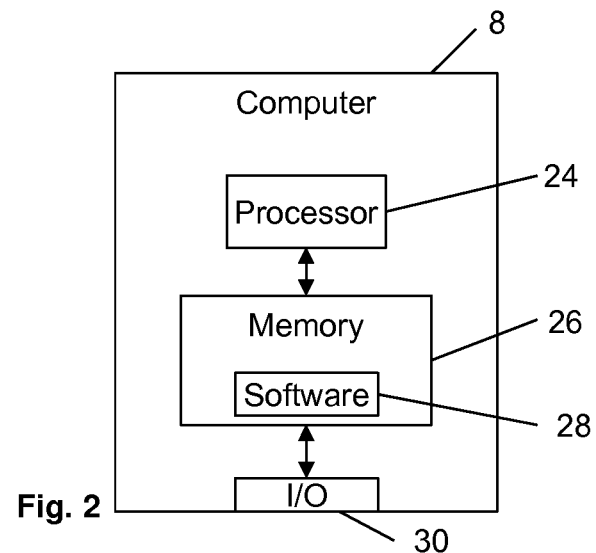
FIG. 2 is a schematic illustration of one embodiment of a computer as used in the electrical or electromechanical installation of FIG. 1.

The input device 5 or at the input device 7, or both, may be configured to read information from an information carrier carried by a person/passenger. For that purpose, the respective input device 5, 7 is equipped with a reader to read data from that information carrier when it is presented to the reader. The read data may represent an authorization to operate the input device 5, 7 or a destination call, or both. In one embodiment, the information carrier has a form factor that corresponds to a credit card or an employee badge. Depending on a particular configuration, the information carrier includes an embedded memory chip having leads to the surface of the information carrier, an embedded RFID transponder in connection with a memory chip, an optical code on the surface (e.g., a barcode or QR code), or a combination of these technologies. In the alternative, the functionality of the information carrier may be implemented in a portable electronic device (e.g., mobile phone, smart phone or tablet PC). These devices may display optical codes, and may also allow radio communication with other electronic devices using known technologies such as Bluetooth or NFC (near field communication). It is contemplated that the reader is compatible with the technology, or the several technologies, used by the information carrier FIG. 2 shows a block diagram of an exemplary embodiment of a computer 8 (e.g., part of an access control system control unit, part of the elevator controller 12, part of a reader, part of a database) that can be used with one or more technologies disclosed herein. The computer 8 comprises one or more processors 24. The processor 24 is coupled to a memory 26, which comprises one or more computer-readable storage media storing software instructions 28 and a database. The computer-readable storage media can comprise, for example, one or more of optical disks, volatile memory components (such as DRAM or SRAM), or non-volatile memory components (such as hard drives, Flash RAM or ROM).

When executed by the processor 24, the software instructions 28 cause the processor 24 to perform one or more of the method steps disclosed herein. Further embodiments of the computer 8 can comprise one or more additional components. The computer 8 can be connected to one or more other computers or electronic devices through an input/output component (interface) 30. In at least some embodiments, the computer 8 can connect to other computers or electronic devices through a network. In particular embodiments, the computer 8 works with one or more other computers, which may be located locally, remotely, or both. One or more of the disclosed methods can thus be performed using a distributed computing system.

With the understanding of the structure of the elevator installation 1 and the functionalities of its components described in connection with FIG. 1 and FIG. 2, various embodiments of a method of operating the elevator installation 1 are described in connection with FIG. 3. This figure describes an exemplary flowchart of a method of operating the elevator installation 1.

Figure 3:
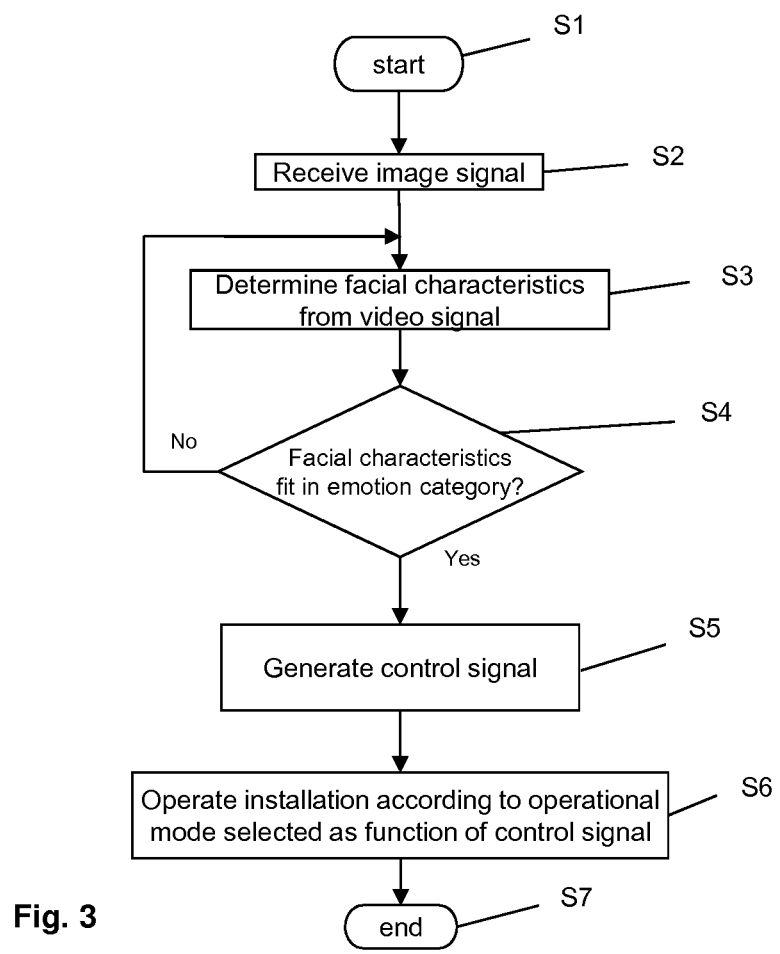
FIG. 3 is an exemplary flowchart illustrating one embodiment of operating the electrical or electromechanical installation.

Referring to FIG. 3, the method starts at a step S1 and ends at a step S7. At a step S2, an image signal is received. In one embodiment, the computer 8 receives an image signal from one of the video cameras 4 on one of the floors L1, L2, L3. The image signal represents an image or a sequence of video images (e.g., a sequence of video frames). The video cameras 4, 6 may be in constant operation regardless of the actual operational status of the elevator installation 1. In another embodiment a video camera 4, 6 may be activated when triggered by a specific event. For example, the video cameras 4, 6 may be activated when movement is detected on a floor L1, L2, L3, or in the elevator car 10, or upon demand (e.g., by security personnel).

In a step S3, facial characteristics are determined from a person's face data comprised in the image signal. The facial characteristics are derived from a person's facial expression using the computer instructions 28 and the database stored in the memory 28 of the computer 8. Computer-assisted analysis of facial expressions is described, for example, in Shichuan Du, et al., "Compound Facial Expressions of Emotion", published online Mar. 31, 2014 at www.pnas.org/cgi/doi/10.1073/pnas.1322355111, pages E1454-E1462. That publication describes a computer model that allows recognition of 21 different facial expressions of emotion, including happy, happily surprised, happily disgusted, surprised, sad, fearful, sadly fearful, fearful angry, fearful surprised, angry, sadly angry, hatred, disgusted, appalled, and awed. For that purpose, the publication uses a facial action coding system given by a set of action units. Each action unit codes the fundamental actions of individual or groups of muscles typically seen while producing facial expressions of emotion. As potential applications of that model the publication mentions the diagnosis and treatment of psychiatric disorders (e.g., schizophrenia), cognitive impairments (e.g., autism) and studies of pain. The computer 8 performs an analysis of a person's facial expression on basis of that computer model.

Depending on a particular software configuration, the computer instructions 28 and the database of the computer 8 may first perform an analysis of the received image signal to locate the person's face in an image. Using a computer to locate a face in a video image is described, for example, in U.S. Pat. No. 8,494,231 B2. In the context of recognizing a face in a video, U.S. Pat. No. 8,494,231 describes running input on-demand video through a processing pipeline having integrated modules that perform face detection, face tracking, face grouping and face recognition to generate face galleries. On a more theoretical level, an algorithm for detecting the location of a face in an image is described in J. Huang, et al., "Automatic Face and Gesture Recognition", pages 248-252, Proceedings of the Second International Conference on Automated Face and Gesture Recognition 14-16 Oct. 1996. Once the face is located, the person's facial expression can be analyzed by the computer 8.

In one embodiment, the various facial expressions and associated emotions are categorized for the specific application in the elevator installation 1. This is based on the assumption that certain emotions may be more or less of a concern for that specific elevator application. For example, a happy person may not be of any concern, but an angry person may be a concern when having to travel with several passengers in an elevator car 10.

Proceeding to a step S4, the determined facial characteristics are evaluated to determine if they fit in one of defined categories of emotion. If the facial characteristics fit, the method proceeds along the YES branch to a step S5. In the step S5, the computer 8 generates a control signal that is associated with the category into which the facial characteristics fit.

In certain cases the determined facial characteristics may not fit in one of the defined categories. For example, this may happen if the image signal does not allow an unambiguous detection of a face because the person turned the face away from the video camera 4, 6 or because of poor illumination of the scene. To avoid the latter case, the area observed by a video camera 4, 6 is to be sufficiently illuminated. In such situations, the computer 8 is in one embodiment set to assign no facial characteristics to the person; this is viewed herein as a "no fit." In that case, the method returns along the NO branch to the step S3.

In one embodiment, the elevator installation 1 may be operated according to one of several operational modes. Each operational mode is associated with a particular control signal. The control signal generated in the step S5 determines which operational mode is to be selected so that the operational mode is selected as a function of the control signal. Proceeding to a step S6, the central controller 12 operates the electrical or electromechanical installation 1 in accordance with the selected operational mode.

For each operational mode of the elevator installation 1, specific settings or parameters are defined to address a passenger's state of emotion. Exemplary setting and parameters are set forth in the following table (Table 1). It is contemplated, however, that other measures may be implemented depending on a particular embodiment (e.g. in a busy office building during peak times, individual settings such as temperature may not be suitable). Further, it is contemplated that other categories and/or facial characteristics may be defined.

TABLE 1

| Category | Emotion | Measure |
| --- | --- | --- |
| 1 | Neutral (incl. happy, happily surprised, happily disgusted, surprised) | Any available car 10 may be assigned to that passenger, no particular performance or environmental considerations |
| 2 | Sad, fearful (incl. sadly fearful, fearful angry, fearful surprised) | Adjust environmental, settings, e.g., light, sound, show distracting multimedia clip, temperature. Communications. |
| 3 | Angry, hatred (incl. sadly angry) | Assign an empty car 10 when destination call is used, service that person's call first to reduce waiting time, no intermediate stops to bring person to destination floor quickly. Communications. |
| 4 | Disgusted, appalled (incl. awed) | Adjust car settings, e.g., light, temperature, multimedia clip |

In the non-limiting example of Table 1, there are four emotion categories shown. The first category is defined as neutral and includes emotions like happy, happily surprised, happily disgusted and surprised. The first operational mode is selected when the facial characteristics fit in the first emotion category. In the first operational mode the central controller 12 operates the electrical or electromechanical installation 1 according to predetermined first operational settings, wherein the first operational settings correspond to predefined normal operation settings. The emotions in the first category are viewed as not requiring particular settings or parameters so that the installation 1 is operated according to its normal settings. For example, a passenger showing emotions of the first category can be assigned any available car 10 without considering settings or parameters that affect the performance (e.g., service time, occupancy) or environment (e.g., illumination/light, sound (music), audio/video (multimedia) or temperature within the elevator car 10).

The second category includes sad and fearful emotions including emotions like sadly fearful, fearful angry and fearful surprised. The second operational mode is selected when the facial characteristics fit in the second emotion category. In the second operational mode the central controller 12 operates the electrical or electromechanical installation 1 according to predetermined second operational settings that modify environmental parameters of the electrical or electromechanical installation 1. For example, a passenger showing emotions of the second category may require more attention that one with emotions of the first category to make the elevator trip more pleasant and enjoyable. Environmental parameters that may affect the passenger's emotions include the light, sound (music), audio/video (multimedia) or temperature within the elevator car 10.

The third category includes angry and hatred emotions including emotions like sadly angry. The third operational mode is selected when the facial characteristics fit in the third emotion category. In the third operational mode the central controller 12 operates the electrical or electromechanical installation 1 according to predetermined third operational settings that affect the performance of the electrical or electromechanical installation 1. For example, an angry or hatred passenger may show aggressive behavior within a crowded elevator car 10 and affect other passengers. To avoid such a situation, that passenger may be better served by assigning an empty car 10 to the passenger. Alternatively, or in addition to the previous measure, the angry passenger's call may be handled first to reduce the passenger's waiting time. Also, a trip without intermediate stops may be provided. Considering the installation 1 as a whole, these measures affect its performance. In some cases the performance is reduced because other passengers have to wait longer due to a trip without intermediate stops.

The fourth category includes disgusted and appalled emotions including emotions like awed. The fourth operational mode is selected when the facial characteristics fit in the fourth emotion category. In the fourth operational mode the central controller 12 operates the electrical or electromechanical installation 1 according to predetermined fourth operational settings that modify environmental parameters of the electrical or electromechanical installation 1. The environmental parameters can be those described in connection with the second operational mode.

In one non-limiting example, the elevator installation 1 is equipped with a destination control system and has several elevator cars 10 available to handle the traffic. In such an environment, a person approaches an elevator landing on a floor L1, L2, L3 where a video camera 4 is installed. The user presents an electronic card (an RFID card) to a reader of the input device 5 that is positioned on that floor L1, L2, L3. The reader reads credential information from the card (in this case, an identification number associated with the person and a destination floor) and sends this information to the elevator controller 12. The elevator controller 12 uses this information to determine that the person is authorized to use the elevator, and to assign an elevator car 10 to service that person's call.

While the person is at the landing, the computer 8 executes the computer instructions 28, determines the person's facial characteristics, assigns them to a category, and selects the most suitable operational mode for that category. For example, if the person is angry or seems hatred (third category), which may cause stress, the computer 8 generates a control signal that sets the third operational mode. That mode is set to optimize the time of an elevator trip between placing a call and arriving at the destination floor. That time may be referred to as "service time" of the elevator trip. In one embodiment, that mode requires immediate service with no stops so that the (angry, stressed) person is transported to the destination floor as quickly as possible.

In another non-limiting example, the elevator car 10 may stop during a trip without the doors opening. e.g., between floors L1, L2, L3. In such a case, it usually takes some time until service personnel arrives on site to solve the problem. Although every person in the elevator car 10 knows that help is on its way, a person may not tolerate being stuck in such a confined space, either alone or with unknown persons. With the video camera 6 being active, the computer 8 could determine if a person is losing its temper, e.g., becomes angry (third category) or fearful (second category). If this is detected early, the computer 8 may generate a control signal that sets the most appropriate operational mode. For example, regarding the second and third categories and the respective operational modes, the computer 8 may cause communications with the interior of the car 10, such as providing an announcement with instructions and/or information. For example, information may be provided about when the service technician will arrive, or, if a multimedia system is available inside the elevator car 10, the location of the service technician could be illustrated on a map. Having information like that may comfort and/or distract the passenger.

Although some embodiments of the various methods disclosed herein are described as comprising a certain number of method acts, further embodiments of a given method can comprise more or fewer method acts than are explicitly disclosed herein. In additional embodiments, method acts are performed in an order other than as disclosed herein. In some cases, two or more method acts can be combined into one method act. In some cases, one method act can be divided into two or more method acts.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope of these claims

What is claimed is:

1. A method of operating an elevator installation, comprising:
   receiving an image signal at a computer from a video camera;
   determining facial characteristics from a person's face data comprised in the image signal using the computer;
   categorizing the facial characteristics into at least one of predefined emotion categories using the computer;
   generating a control signal by the computer corresponding to the at least one of predefined emotion categories; and
   operating the elevator installation an elevator controller in accordance with one of several operational modes, wherein the one of several operational modes is selected as a function of the control signal.

2. The method of claim 1, wherein a first operational mode is selected when the facial characteristics fit in a first emotion category comprising neutral emotions, wherein in the first operational mode the elevator controller operates the elevator installation according to predetermined first operational settings, wherein the first operational settings correspond to predefined normal operation settings.

3. The method of claim 1, wherein a second operational mode is selected when the facial characteristics fit in a second emotion category comprising sad and fearful emotions, wherein in the second operational mode the elevator controller operates the elevator installation according to predetermined second operational settings that modify environmental parameters of the elevator installation.

4. The method of claim 1, wherein a third operational mode is selected when the facial characteristics fit in a third emotion category comprising angry and hatred emotions, wherein in the third operational mode the elevator controller operates the elevator installation according to predetermined third operational settings that affect a performance of elevator installation.

5. The method of claim 1, wherein a fourth operational mode is selected when the facial characteristics fit in a fourth emotion category comprising disgusted and appalled emotions, wherein in the fourth operational mode the elevator controller operates the elevator installation according to predetermined fourth operational settings that modify environmental parameters.

6. The method of claim 1, wherein the elevator controller controls operation of an elevator car of the elevator installation, wherein the elevator car is moveable between floors of a building.

7. The method of claim 6, wherein environmental parameters are defined for the elevator car concerning at least one of temperature, illumination, sound and multimedia within the elevator car.

8. The method of claim 6, wherein performance parameters of the elevator installation include at least one of service time of an elevator trip and occupancy of the elevator car.

9. An elevator installation, comprising:
an elevator controller for controlling operation of the elevator installation;
a computer communicatively coupled to the elevator controller to output a control signal to the elevator controller;
a first video camera communicatively coupled to the computer to output an image signal to the computer;
wherein the computer comprises a memory storing computer instructions to determine facial characteristics from a person's face data comprised in the image signal, to categorize the facial characteristics into at least one of predefined emotion categories, and to generate a control signal corresponding to the at least one of predefined emotion categories; and
wherein the elevator controller operates the elevator installation in accordance with one of several operational modes, wherein the one of several operational modes is selected as a function of the control signal.

10. The installation of claim 9, comprising an elevator car positioned in an elevator shaft to travel between floors of a building, wherein the first video camera is located inside the elevator car.

11. The installation of claim 9, comprising an elevator car positioned in an elevator shaft to travel between floors of a building, wherein the first video camera is located outside the elevator car on a floor.

12. The installation of claim 9, comprising an elevator car positioned in an elevator shaft to travel between floors of a building and a second video camera, wherein the first video camera is located inside the elevator car and wherein the second video camera is located outside the elevator car on a floor.

13. The installation claim 9, wherein the installation further comprises an elevator car, and wherein the elevator controller controls environmental parameters defined for the elevator car concerning at least one of temperature, illumination, sound and multimedia within the elevator car.

14. The installation of claim 9, wherein the installation further comprises an elevator car, and wherein the the elevator controller controls performance parameters including at least one of service time for an elevator trip and occupancy of the elevator car.

* * * * *